United States Patent [19]

Silverman

[11] 3,876,990

[45] Apr. 8, 1975

[54] METHODS OF STORING INFORMATION USING ARRAYS OF MULTIPLE SPOT PATTERNS

[76] Inventor: Daniel Silverman, 5969 S. Birmingham St., Tulsa, Okla. 74105

[22] Filed: July 5, 1973

[21] Appl. No.: 376,904

Related U.S. Application Data

[60] Division of Ser. No. 278,979, Aug. 9, 1972, Pat. No. 3,753,249, which is a continuation of Ser. No. 67,135, Aug. 26, 1970, abandoned, which is a continuation-in-part of Ser. No. 612,698, Jan. 30, 1967, Pat. No. 3,550,085, and a continuation-in-part of Ser. No. 721,998, April 17, 1968, Pat. No. 3,560,072.

[52] U.S. Cl.................340/173 LM; 179/100.2 MD; 350/162 R

[51] Int. Cl........................................... G11c 13/04

[58] Field of Search................ 340/173 R, 173 LM; 179/100.2 MD; 353/25; 350/162 R, 162 ZP

[56] References Cited

UNITED STATES PATENTS

| | | | |
|---|---|---|---|
| 3,392,400 | 7/1968 | Lamberts | 340/173 LM |
| 3,492,660 | 1/1970 | Halverson | 340/173 LM |
| 3,501,586 | 3/1970 | Russell | 340/173 R |
| R26,918 | 6/1970 | Chapin | 360/121 |

*Primary Examiner*—Terrell W. Fears

[57] ABSTRACT

The systems of this invention involve the storage of information on a record medium in the form of patterns of spots arrayed along one or more tracks, the patterns are spaced apart a distance which is a fraction of the length of the pattern so that there is partial overlap of the patterns along the track. The patterns may be uniformly or non-uniformly spaced spots, and the patterns can be sequentially the same or different patterns. All of the spots in the patterns have the same character, and are presented to a reading means sequentially. The spacing of patterns along the track may be uniform or variable. Each pattern may represent a single bit, or a single character.

16 Claims, 16 Drawing Figures

METHODS OF STORING INFORMATION USING ARRAYS OF MULTIPLE SPOT PATTERNS

CROSS REFERENCE TO RELATED APPLICATIONS

This application is a divisional application of my copending application Ser. No. 278,979, filed Aug. 9, 1972, now U.S. Pat. No. 3,753,249, dated Aug. 14, 1973, entitled: "Information systems using arrays of multiple spot patterns", which was a continuation of copending application Ser. No. 67,135, filed Aug. 26, 1970, now abandoned, which was a continuation in part of Ser. No. 612,698 filed Jan. 30, 1967, now U.S. Pat. No. 3,550,085 and Ser. No. 721,998, filed Apr. 17, 1968, now U.S. Pat. No. 3,560,072.

FIELD OF THE INVENTION

This invention is concerned with the field of information storage. More particularly it is concerned with digital information stored at high density on web media in the form of patterns of spots. Still more particularly this invention is concerned with the recording, storage, and reading of information optically and magnectically.

PRIOR ART

Digital data and information, in the prior art has been stored on strips in the form of patterns of spots. Examples of these are many, in the area of magnetic tape recording and in spot pattern indexing of microfilms, etc. For examples of these refer to my issued U.S. Pat. Nos. 2,820,907, 3,158,846 and 3,179,001. One of the weaknesses of these systems is that as the packing density increases and the spots become smaller, there is danger that a speck of dust, or a tiny flaw in the record medium might cover or otherwise obliterate one or more spots, which would means loss of the information represented by these spots.

more recently, as exemplified by my two copending applications Ser. No. 612,698 and 721,998, effort has been expended to devise recording systems in which a single bit, or a single character of information is represented by a pattern of spots rather than by a single spot. The patterns used are of a particular nature in that each particular pattern is compressible by correlation, or by other electrical or optical means, to a single-valued, point function. In other words, by correlation, they produce a single peak value; by measurement of frequency they produce a single value of frequency or a point of light in an optical Fourier system, or, as in holography, a Fresnel zone plate pattern will compress or focus to a point of light.

An example of this in the prior art is the Lamberts et al patent U.S. Pat. No. 3,392,400. Lamberts used a photographic recording of an optical grating (a uniformly-spaced pattern of spots) which in a Fourier transform optical system compress to a point in the frequency plane. Also, in my copending applications I disclose a particular kind of a non-uniformly-spaced pattern that can correlate with itself in only one position, and a hologram, which can be thought of as being made up of a plurality of Fresnel zone plate patterns each of which compress to a point.

The advantage of all of these patterns is that they cover an area of the record medium many times larger than the area of a single spot, and therefore if a speck of dust or a flaw should occur part of the light that falls on the total pattern will be obscured, and the remaining portion of the pattern will still compress to a point signal. Thus, unless substantially all of the pattern is covered, the bit or character of information represented by the pattern will not be lost.

There is a feature of both applications Ser. No. 612,698 and 721,998 that is new and novel in the art. That is, that the successive patterns of spots that are recorded on the web or strip are neither (1) placed in contiguous positions along the strip where there is no overlap, as in conventional microfilm, nor (2) placed completely superimposed in the same specific area of the strip, as in Lamberts. In these applications the separate patterns are overlapped a portion of their length along the strip. For example if they are recorded at a spacing, d, along the strip, and if the length of the pattern is D, then $d = D/K$ where K has a value of at least 2. If K has a value of say, 10, for example, there will be, at any point on the strip, 10 superimposed patterns, each displaced along the strip with respect to its neighbors by the distance $d$. This partial superposition, or partial overlap, of say, 10 patterns, provides multiple use of the strip, and permits, for example a pattern which is 10 times as long as a spot, (in conventional digital recording) to have the same packing density, with 1/10th the susceptibility to dust particles, etc. It is of course clear that due to the high resolution available in photographic film, the sizes of the spots in my patterns are much smaller than the "spots" used in conventional ditital spot recording.

The use of photographic recording, because of the high resolution of film generally available, permits spot patterns with many spaced spots that take up little greater area than the conventional spots in digital spot patterns. In this invention I describe more fully the details of the types of patterns that can be used to advantage, and the corresponding recording and reading or detecting means in recording of information by partially overlapped multiple spot patterns.

SUMMARY OF THE INVENTION

This invention is applicable to many types of recording such as magnetic (as described in my application Ser. No. 612,698;) and optical, such as described in both applications Ser. No. 612,698 and 721,998. Further, the optical system can be photographic using conventional silver halide film, photochromic or Kalvar, type films. Or it can be electrostatic or electrographic recording with optical readout. I shall concentrate primarily on photographic recording, for convenience, it being understood however, that other methods can be selected. Also, while this invention is applicable to all forms of records, such as sheets, discs or strips, it will for convenience be described in terms of strips. in Many types of spot patterns are actually, or can be thought to be, composed of the superposition of many individual simpler patterns. For example, in holography (as described in my application Ser. No. 721,998) the hologram of a group or array of spots can be thought of as the superposition of holograms of each of the spots recorded separately. The hologram of a point source of light is a particular type of pattern called a Fresnel Zone Plate pattern (FZPP). So the hologram of an array of spots or point sources will be a superposition of many FZPP, one for each of the spots. This can be demonstrated by actually recording one spot at a time, or by recording all at the same time. in any case, when the resulting hologram is reconstructed, or the pattern "compressed", one point image will be provided for each FZPP. I will therefore consider in this application that a spot pattern will represent only a single point value. Where there are complex patterns (such as holograms) they will be considered to be the complete superposition of many spot patterns, each representing a different single point value.

When I say "representing a single point" I mean that the information recorded is the presence or absence of a spot, or point (or in general, a single-valued point signal) at a prescribed position relative to the record, or alternatively, the spacing between adjacent points or patterns in a track. Also, when I speak of "compressing to a point", I mean the point represented by the pattern, when compressed, or imaged, or reconstructed by correlation, Fourier transform, or by holographic reconstruction and imaging.

BRIEF DESCRIPTION OF THE DRAWINGS

In FIG. 10 by correlation, and in FIG. 11 the reconstruction of Fresnel Zone Plate patterns.

FIG. 12 illustrtes the recording. FIG. 14 illustrates different spacial frequency gratings. FIG. 13 illustrates the reading or detecting of grating patterns.

DESCRIPTION OF THE PREFERED EMBODIMENTS

Figure 1:
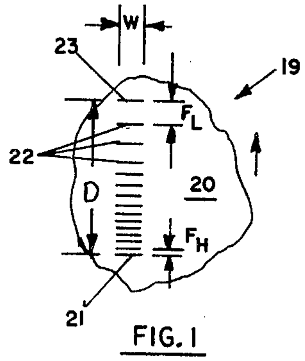
FIG. 1 represents one type of multiple spot patter; a swept frequency pattern.

Refer now to the drawings, and in particular to FIG. 1 which is identical to FIG. 1*a* of my copending application Ser. No. 612,698. In FIG. 1 is represented a pattern 19 of spots 22 arranged along a track 21. The individual spots (which are here illustrated as short transverse bars or lines 22) are all of the same character. That is they are either opaque or transarent or reflective or non-reflective, or of a certain color, and a detector sensitive to their specific character will respond to the relative passage of each pattern past the detector. In my application Ser. No. 612,698 I was concerned with spot patterns of a particular type, namely those which when correlated with a facsimile of themselves, would give a response with only a single peak of correlation. In a short hand way I described these patterns as "unigue", in that "they correlate with themselves in only one position". One such type of pattern is the so-called "swept frequency" pattern (as illustrated in FIG. 1), in which the spatial frequency of the spots varies from a low value $F_L$ to a higher value $F_H$, or vice versa. The range of frequency is called the bandwidth of the pattern.

In this application I shall be concerned more generally with these and other types of patterns, and with other means of recording and detecting, or compressing these patterns. The basic principle disclosed in Ser. No. 612,698 and Ser. No. 721,998 of the partial overlapping of patterns along the track is basic to this application also.

In FIG. 2*a* I show a plurality of patterns (like FIG. 1) 28*a*, 28*b*, 28*c*, etc. These are actually in the same track, partially overlapping each other, but as shown displaced to the side of the track 21 for clarity of illustration. Each of the patterns (shown as elongated rectangles) are of length D and are displaced along the track by incremental distances *d*. The information recorded in this type of information system is the presence or absence of a bit, or a single unit of information, represented by the pattern. Thus, in binary notation, the information represented by the four patterns would be 10111, because of the equal spacing basis, there is one pattern missing between 28*c* and 28*d*, and this represents a 0.

In FIG. 2*b* I show a variation of the system of FIG. 2*a* in which the incremental spacing *d*, between patterns is variable, $d_a$, $d_b$, $d_c$ etc. In this system the spacing *d* is the information recorded. This is equivalent to pulse-time modulation where the pulses are long, and overlap each other instead of being short and fully separated in time (or space). Of course, when these patterns are detected and compressed to points or short pulses, they will be fully separated as in conventional pulse-time modulation.

Figure 2:
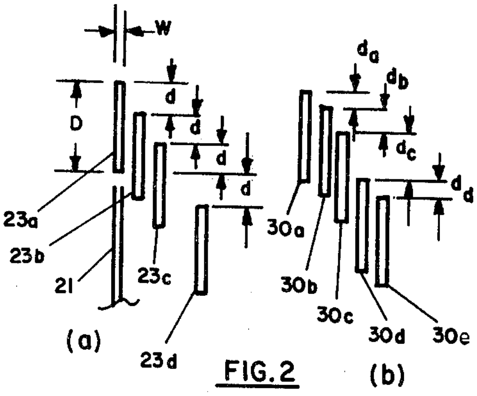
FIG. 2 illustrates two ways in which such patterns as shown in FIG. 1 can be used.
Figure 3:
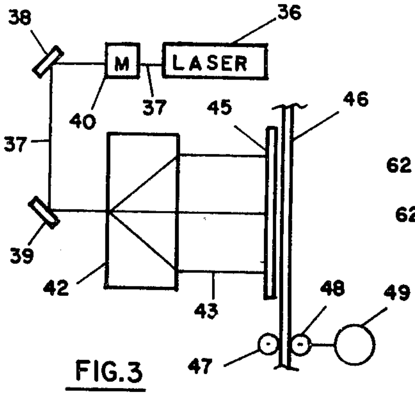
FIG. 3 illustrates one method of recording multiple spot patterns.
Figure 8:
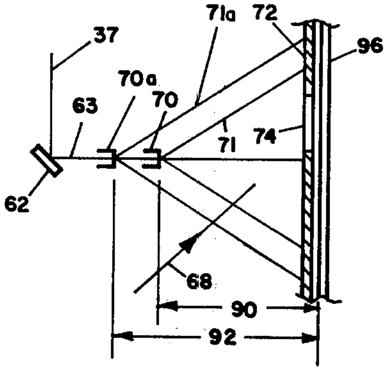

In FIG. 3 illustrate one way in which the record of FIG. 2 can be made. This shows a light source as a laser 36 with beam 37 to light modulator 40, mirrors 38, 39 and collimating optics 42. The modulator can be a mechanical shutter, or preferably, an electro-optic crystal devise, well known in the art which can very rapidly control and vary the intensity of the light passing through. The collimated beam 43 illuminates the mask 45 which carries a facsimile of the pattern of spots (such as 19)) in the form of a translucent pattern. Closely adjacent the mask is the record medium 46 with transverse means, rollers 47, 48 and motor 49. The pattern of the mask 45 is contact printed onto the film 46. If desired, as shown in FIG. 8 of my application Ser. No. 612,698, the mask can be imaged by a second optics and the film record 46 placed in the plane of the image, as it well known in the art.

In my related copending application Ser. No. 721,998 I disclose an information system using patterns of spots. These patterns are of a particular nature, as concerns the method for detecting or compressing the patterns into points. These systems, like those in Ser. No. 612,698 utilize the basic principle of partial overlap along the track. These patterns are called holograms and I will now discuss several embodiments of this invention utilizing halograms.

Holography is a relatively new invention, but its basic system goes back in time to the work of Fresnel, who found that using coherent light, the expanding spherical wavefront from a point source, when interfered with by a plane wave of light of the same frequency, produced a characteristic interference pattern called a Fresnel Zone Plate pattern, or FZPP. This pattern has the property when illuminated with a plane wave of coherent light, of forming (both a virtual image and) a real image of the point source from which it was recorded. In other words, the FZPP has the property, when illuminated by a plane wave of coherent light of compressing the pattern to a point. If a portion of the FZPP is masked off, the light reaching the remaining portion will still be compressed or imaged to a point. And, since any object scattering light can be thought of as having an array of many point source positioned over its surface, a hologram of such an object can be thought of as the superposition of many FZPP. In the following descriptions I will speak of holograms as compresing a plurality of patterns, each of which will be at least part of a FZPP, and all of which will be completely superimposed.

Figure 4:
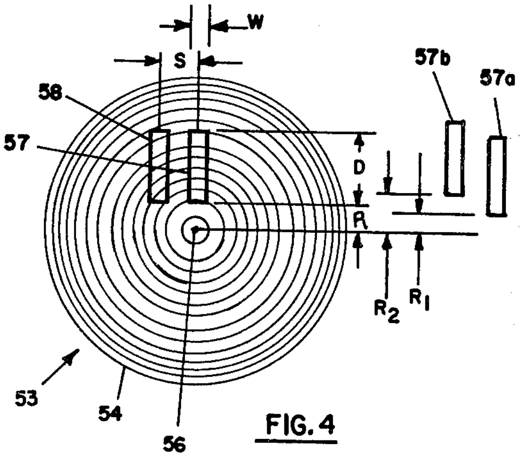
FIG. 4 illustrates a Fresnel Zone Plate pattern.

Now let us consider further the use of an elongated pattern which is a portion of a FZPP. In FIG. 4 I show a pattern 53 of concentric circles 54 with center at 56. This is a classic pattern, well known in optics, and described in textbooks such as Fundamentals of Optics by Jenkins and White, McGraw Hill 1957, and others. The spacings between circles are variable, and are functions of the distance from the source, and the wavelength of the light. As mentioned above, this FZPP has the property such that when illuminated by coherent light, part of the light which passes through (the transparency) will be brought to a point focus. The same thing happens even if we mask off most of the FZPP and let the light fall only on a strip 57, of length D and width W. Light falling on this strip pattern of spots, or short bars which are portions of the circles 54, will be brought to a focus at a point along an axis through the center 56. This will be described more fully below.

I show the pattern 57 radially offset from 56 by the distance R. In FIG. 4*b* I show two strip patterns 57*a* and 57*b* (laterally displaced for convenience) with in-line offsets $R_1$ and $R_2$. It will be clear that if these two patterns were completely superimposed, and then illuminated, light would be brought to a focus at two points respectively $R_1$ and $R_2$ below the position of the patterns. Thus, since the single-valued signals, or focus points of light would be spaced apart, they would be subject to separate identification or reading. This illustrates the fact that two patterns that are different, and which compress to different signals can be fully overlapped. On the other hand, two patterns that are the same and compress to the same signal cannot be completely superimposed, but they can be partially overlapped as shown in my application Ser. No. 612,698.

Referring again to FIG. 4*a* I show another strip pattern 58 composed of a different portion of the FZPP. This pattern 58 is similar to 57 but displaces a distance S to the side. The pattern 58 is also made up of a pattern of spots or short bars, again representing portions of the circles 54. It is clear from what has been described above that the pattern 58 will likewise reconstruct, or compress to a point along the axis 56, and will be displaced laterally by a distance S, and longitudinally by a distance R. Now if patterns 57 and 58 are completely superimposed and reconstructed with coherent light, two spots will be detected arrayed on a line transverse to the direction of the track. So, by choosing the proper portions of the FZPP to form the patterns, a plurality of different patterns can be completely superimposed to form a composite pattern which will compress to a plurality of spots in-line with the track, or transverse to the track, or more generally in a two-dimensional array. Such a composite pattern would be generalized hologram of the two dimensional array of spots to which it compresses.

Figure 6:
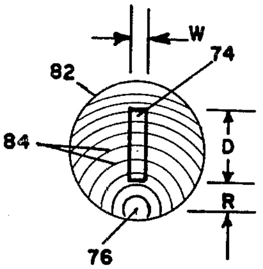
FIGS. 5 and 6 illustrate apparatus for recording Fresnel Zone Plate patterns.
Figure 5:
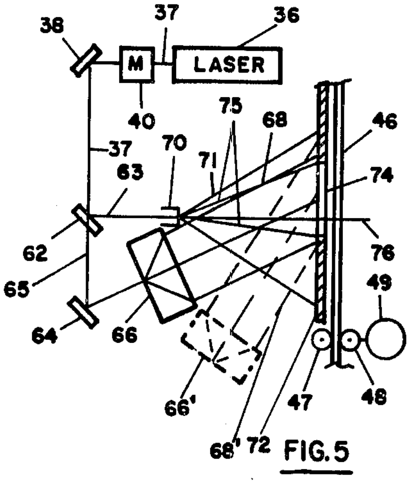

The pattern 57 can be recorded on a strip film 46 as in FIG. 3, by recording a translucent copy of the pattern on a record 45 and contact printing it onto the film strip 46, or imaging it onto the film strip 46, as is well known in the art. However, the FZPP can be formed by classical optics, as shown in FIGS. 5 and 6. Here I show a source of coherent radiation, such as a laser 36, light modulator 40 with beam 37 going to mirror 64 and beam divider 62 diverting a portion of the light as beam 63 in pinhole 70, beyond which the light 71 diverges toward a mask 72 with slotted opening 74 exposing a portion of the film 46 behind the opening. The remaining portion 65 of the beam 37 goes to mirror 64', optics 66 to form a collimated beam 68, also directed to the slotted opening in the mask. As shown in FIG. 6, over the circular area 82 of the beam 68 where it is superimposed on the beam 71, there will be optical interference and there will be an interference pattern 84 which is a portion of a FZPP with its center at 76, which is the axis of the beam 71. The opening 74 in the mask will permit the pattern (such as 57) to be recorded.

Figure 7:
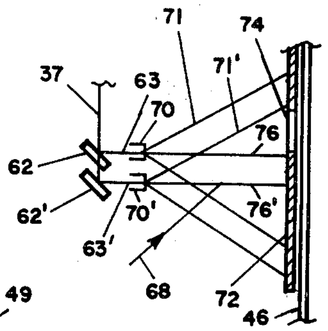
FIGS. 7, 8 and 9 illustrate how different Fresnel Zone Plate patterns can be recorded.

It will be clear that relatively displacing the position of pinhole 70 longitudinally or transversely with respect to the film 46 will expose the film to different portions of the FZPP as represented for example by 57*a*, 57*b*, 58, etc. This is shown schematically in FIG. 7, which represents a portion of FIG. 5 showing beam 37, mirror 62, pinhole 70 and beam 71 impinging on opening 74 in mask 72 and film 46. The second or reference beam 68 is the same as in FIG. 5 and is not shown except by arrow 68. I show an alternate position of mirror 62', beam 63', pinhole 70' and beam 71' with axis 76'. Also, in FIG. 8 I show alternate position 70*a* of the pinhole at distance 92 from the film 46 instead of 90, for the position 70 of the pinhole. Changing the distance 90, 92 will change the FZPP by changing radial spacing of the circles 54, and will change the distance from the film 46 the impinging coherent light will be brought to a focus. Thus, by choice of the particular FZPP and the particular portion of the pattern recorded on the film, light can be brought to a focus at any point in a 3 dimensional volume.

Figure 9:
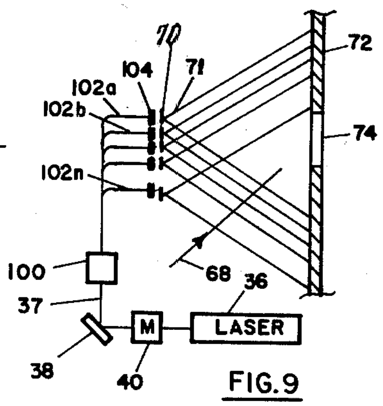

Instead of relatively moving the film and the pinhole to different positions, I show in FIG. 9 how the beam 37 from the laser 36 and modulator 40 can go to optics 100, where the light is placed on the ends of a plurality of optical fibers 102*a*, 102*b*, 102*n*, etc. The other ends of the fibers go to a 2 dimensional array of positions (only 1 dimension shown). Here the fibers go to corresponding pinholes 70 with intervening masks or shutters 104 that can be lifted or dropped (by means not shown) so as to expose light to the individual pinholes, or not. Thus the particular pattern of light spots (pinholes) can be chosen at will and the corresponding FZPP of each spot will be superimposed on the film to form a composite hologram.

Figure 10:
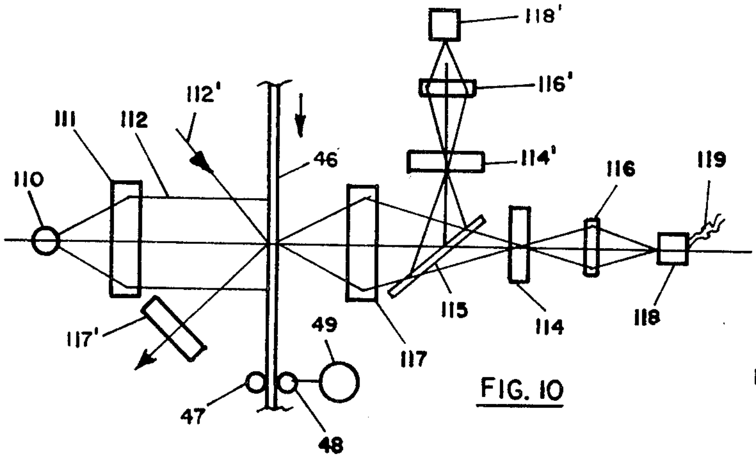

I would like now to discuss another aspect of the partially overlapped patterns. In FIG. 10 I show schematically an optical means to read patterns such as 19 of FIG. 1 or 57, 58 of FIG. 4, etc. This involves a source of (preferably) coherent radiation 110, optics 111 forming a collimated beam 112. This illuminates film 46 with its pattern (such as 19). A mask 114 with an identical (facsimile) pattern is behind the film 46 so the light that passes through the film pattern and imaged by optics 117 also passes through the facsimile pattern in a correlation operation. The light passing through the mask is concentrated by optics 116 onto sensor 118 with output leads 119. When the pattern on the film is in exact alignment with the pattern on the mask, a peak value of light, representative of the presence and alignment of the film pattern will be sensed by 118.

I also show in FIG. 10 how, by altering the direction 112' of the incident beam, a lens 117' can image the light reflected or scattered from the front face of the film. The image of the illuminated front face can then be superimposed onto the facsimile to form a correlation product. Thus the reading process can be carried out by transmission of light through th record, or by reflection of light from the face of the record.

Figure 11:
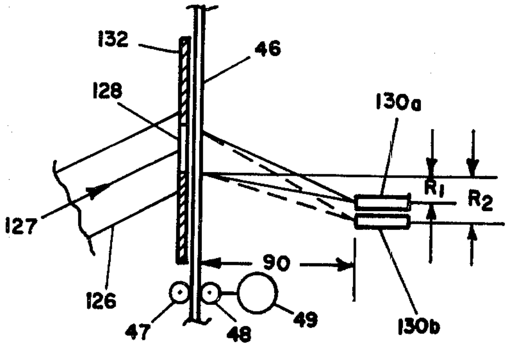
FIGS. 10 and 11, illustrate the compression, reading, or detection of multiple spot patterns.

In FIG. 11 I show another form of detector useful for reading or detecting patterns of the type of 57, 58, etc., which are holograms or portions of holograms. A collimated beam of coherent light 126 in the direction 127 shines on the film 46 over the aperture 128 in mask 132. Assume that two patterns 57*a*, 57*b* are superimposed on the film and directly behind the aperture 128. The beam 126 is at the same angle as the reference beam 68 of FIG. 5. This beam 126 will reconstruct the two images 57*a*, 57*b* to two point images displaced by distances $R_1$, $R_2$ below the aperture and distance 90 behind the film. These two real images will fall respectively onto two light sensors 130*a*, 130*b* and be detected. If the two overlapped patterns were 57, 58, the two images would be on a line transverse to the pattern instead of colinear with the pattern, as in FIG. 11. It will be clear that by choosing a two-dimensional pattern of pinholes as in FIG. 9, and with a reference beam 68, a plurality of FZPP will be recorded completely superimposed to form a composite hologram, that can be reconstructed to provide a two-dimensional pattern of point images, corresponding to the pattern of pinholes.

I have so far discussed elongated patterns of spots that can be recorded on film and can later be compressed by correlation or by optical means such as wavefront reconstruction to corresponding spots, one for each pattern. In the patterns so far described (I will call them Type A) the compressed single-valued signal occurs at one position of the pattern, with respect to the facsimile, or with respect to the sensor. In othere words, the signal to which the pattern compresses can be thought of as travelling with the pattern on the moving film. Later I will describe patterns that remain fixed in space irrespective of the movement of the film, but for the moment I will discuss only those patterns whose signals are fixed geometrically with respect to them. If there is only a single pattern of dimensional D, then as successive patterns come into position with each incremental movement *d*, of the film, the successive patterns will compress to the same point. So we can state that similar patterns which are of a nature that their signal travels with them (Type A), (or patterns whose signals are geometrically related to them) cannot be completely superimposed, but they can be partially overlapped.

If there are a plurality of different patterns whose signals are aligned on a line transverse to the track, they can be completely overlapped, since although their signals occur at the same time, they are laterally spaced and can be independently detected. Groups of such different patterns (which are completely overlapped to form a composite pattern) can be partially overlapped.

Now we come to composite pattern (such as holograms) which compress to a two-dimensional array of points, or to at least one longitudinal array of points. These cannot be partially overlapped since the line of spot signals will be superimposed on the sensors for many positions of the film.

To handle this situation we have to go to the system outlined in my copending application Ser. No. 721,998. Here I use a system of recording holograms in which for each incremental movement *d*, of the film I use a different reference beam. Thus, while two holograms can be partially overlapped I can selectively reconstruct one or the other by choice of the proper reference beam. I show this schematically in FIG. 5 by the dashed reference beam 68' at a different angle with respect to the film 46. This is fully described in my copending application Ser. No. 721,998.

There is another class of multiple spot pattern that can be generated by apparatus of the general type of FIG. 5, and can be detected by optical sensors while the patterns are illuminated by coherent light. These are grating patterns due to interference between coherent light beams of the same frequency. They can be generally classed as holograms although they are holograms of plane surface objects rather than holograms of point objects. They can be detected by coherent light and Fourier optics. These are linear gratings such as described by Lamberts in U.S. Pat. No. 3,392,400.

In his patent Lamberts shows a pluraltiy of gratings, each one a pattern of equally spaced lines or spots, the spacings in each pattern are different from the spacings of the others. He shows that:

1. The patterns are elongated in the direction of the spots, but the elongated dimension is set transverse to the direcion of the track,
2. All spots in the patterns are presented to the detecting means simultaneously,
3. The different patterns are completely superimposed on each other in the precisely same space, and
4. There is no overlap of patterns along the track.

Contrary to Lamberts, the system of this invention is entirely different, as follows. In my system:

1. the different patterns are elongated in the direction of the spots, and the elongated dimension is set in line with the track,
2. The spots of the patterns are presented sequentially to the detecting means,
3. None of my patterns are completely superimposed on each other, and,
4. There is partial overlap of patterns along the track.

Figure 12:
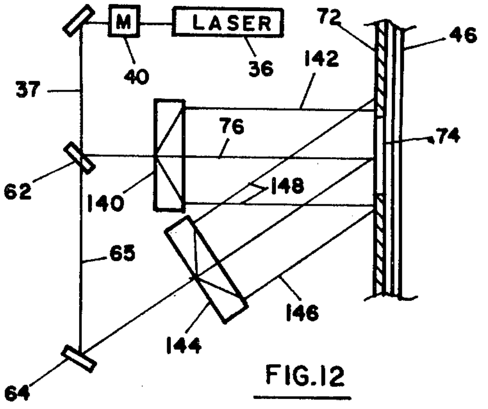
FIGS. 12, 13, 14 relate to grating patterns.
Figure 13:
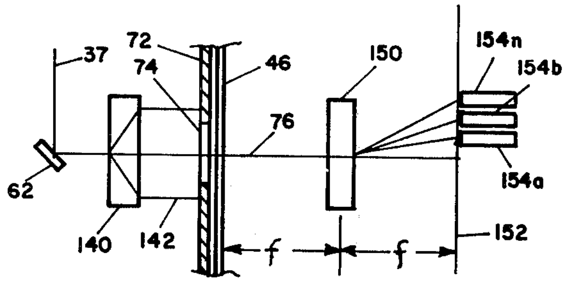
Figure 14:
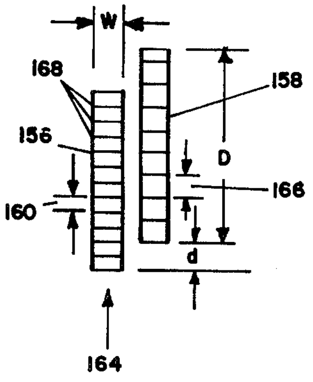

In FIGS. 12, 13 and 14 I show an embodiment of this invention for recording linear gratings. These are multiple spot patterns, like the portions of the FZPP, except that the spacing 160 between spots 168 is a constant for a given pattern such as 156, but different from the spacing 166 of the other patterns, such as 158. Such patterns of equally spaced spots as 156, 158, etc, can be generated by the apparatus of FIG. 12 showing two collimated beams of coherent light 142, 146 (derived from the same laser 36 through modulator 40 and optics 140 and 144) and overlapped at a specific angle 148, over the area of the aperture 74 in the mask 72. Here the beams interfere and generate the linear grating pattern. The spacing between lines 168 is a function of the angle 148 between the beams, and the wavelength of the light. The different spacings 160, 166 etc, can be generated by changing the angle 148.

By comparing FIGS. 5 and 12, it will be seen that the only difference lies in the nature of the beam 71, which in FIG. 5 is an expanded beam with spherical wave fronts, while in FIG. 12 beam 142 is a collimated beam with parallel plane wave fronts.

Given a grating such as 158, for example on the film 46, I show in FIG. 13 one way in which the pattern can be detected. Here the laser beam 37 through mirror 62 and optics 140 (as in FIG. 12) forms a collimated beam 142 which illuminates the grating pattern on film 46 through aperture 74. This illuminated pattern is presented to lens 150 at a distance *f*, its focal length, back of the film. In the Fourier plane 152, at a distance *f* behind the lens 150, the light will be brought to points of focus according to the spacing or special frequency of the pattern. I show a plurality of photoelectric sensors 154*a*, 154*b*, 154*n* etc. in the plane 152 at distances from the axis 76 such that, depending on the spacial frequency of the pattern, the light will focus on one or the other of the sensors.

Like all of the patterns described above, each pattern represents one bit or one character of information. All spots in the pattern are of the same optical character. Also I show a second pattern 158 of different spacial frequency. It acually partially overlaps, by a distance, D-*d*, the pattern 156. I show them to the side for convenience, actually they will both be aligned in track 164. Thus, I can say generally, that on the track 164 are a plurality of different patterns (each one of linear grating, but different in spacial frequency) of longitudinal dimension D and spaced along the track by incremental distance *d*, where $d = D/K$, where K has a value of at least 2. In other words, there can be K different patterns, incrementally overlapped, each one representing one bit or one character of information. This group of K different patterns can then be recorded again, or individual selected ones recorded in the array of overlapped patterns. However, it is not possible to overlap two identical patterns, only different patterns.

Figure 15B:
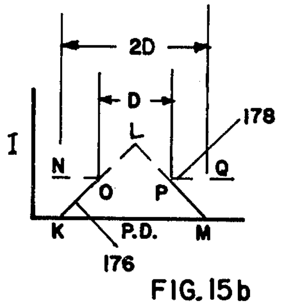
FIGS. 15*a*, 15*b* illustrate the type of electrial output detected as the recording patterns approach and leave the optical detecting aperture.
Figure 15A:
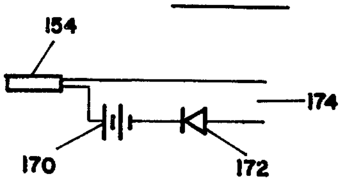

Consider in FIG. 13 a single pattern 158 on the film 46 directly behind and fully aligned with the aperture 74 in mask 72. The maximum amount of light will pass to lens 150, and the spot on senser 154*a* (for example) resulting from pattern 158 will be the brightest. As the film moves, a smaller part of the pattern 158 will now be exposed in the aperture, so the spot on 154*a* now is less bright. So it will be seen that as the pattern comes into view through the aperture, light will be focussed on 154*a* which will increase in brightness until the pattern fits the aperture and then decreases. Thus for this kind of pattern the spot stays fixed with respect to the optional system of the detector, but increases in brightness to a peak when the pattern is centered in the center of the detecting aperture. I show in FIG. 15*b* in a plot of sensor current, I, as ordinate vs. pattern displacement, P.D., as abscissa. The curve 176 shows the sensor current rising from zero at K to a maximum at L and back to zero at M, for a total displacement of the pattern of 2D. It is possible, as in FIG. 15*a* to use a bias battery 170 and diode 172 to have a current variation represented by the dashed curve N, O, L, P, Q, which although it has a smaller peak value is much narrower in width (such as D).

To summarize, I have shown systems of digital information storage and retreival in which:

1. each bit or each character is represented by
   a. a multiple spot pattern of length D.
   b. the pattern is enlongated in the direction of the array of spots,
   c. the pattern is placed on the track with its elongation in the direction of the track,
2. the patterns are partially overlapped along the track, being spaced by incremental distances *d*, where $d = D/K$ where K has a value of at least 2, and
3. the patterns can be detected by correlation, or by irradiation by coherent light,
4. dissimilar patterns that can be compressed to point signals at different positions such that they can be independently detected can be superimposed completely as a group or plurality of patterns, and different pluralities of patterns can be overlapped by being spaced distances *d* apart.

in the foregoing description of this invention and of the several embodiments illustrated in the drawings, I have shown in FIGS. 10, 11 and 13 means for reading the patterns of spots and producing an electric signal indicative of said patterns. For example, in FIG. 10 I show how a multiple spot patterns can be detected by correlating the pattern on the record 46 with the pattern on a facsimile 114. This involves imaging the pattern on the record 46 by means of optics 117 onto the facsimile 114, and collecting the light passes through the facsimile, by optics 116, onto sensor 118, where a single-valved point signal appears on leads 119. By single-valued point signal I mean that the peak value of sensor signal occurs at a precise single point or position of the film with respect to the reading means.

Also, in FIG. 11 I show how a FZPP on film 46 can be detected and read by irradiating the film with coherent light beam 126, whereby the light passing through the film 46 will be focussed to a point image at sensor 130. The position of the image point 130 is uniquely determined by the particular pattern on the film, and different patterns can be focussed at different-points 130*a*, 130*b*. The light focussed at different points 130*a*, 130*b* can be detected independently of each other.

Referring again to FIG. 10 I show a beam splitter 115 that divides the light passing through the film 46 into two beams respectively brought to focus onto two facsimile transparencies 114 and 114′, and then collected onto separate sensors 118, 118′. So if there were on the film two different correlatable patterns represented by the two facsimiles 114, 114′, respectively, these two patterns could be independently detected at the two spaced sensors 118, 118′. The signal on the sensors being single-valued signals of each of the patterns respectively. Of course, as many sensors 118 and 130 can be provided as desired.

Instead of the beam splitter 15 it will be clear that two spaced correlation systems can be provided to which the patterns are sequentially presented.

In FIG. 13 I show another detecting system for patterns of the uniformly spaced grating types, where different patterns are detected at different sensors 154*a*, 154*b*, 154*n*, etc. This apparatus in FIG. 13, and the patterns on the film are different from those in FIGS. 10 and 11. In the latter, the swept frequency patterns of FIG. 10 and the FZPP and holograms of FIG. 11 have compressed signals which are fixed with respect to, and move with the pattern on the film. On the other hand, with the grating pattern along the track, each incremental portion of the pattern looks the same to the reading means, and the compressed signal is fixed in position with respect to the reading means, and not to the film.

Thus, I speak of "compression" or "detection" of the long spot patterns to spots of light brought to a point focus, or to the peak signal detecting by a correlation means or, in general, to "single-valued point signals". These can be detected at unique positions, P, with respect to the patterns, or with respect to the reading means. Different patterns of the Type A, which compress to signals at different fixed position with respect to the patterns, can be multiply recorded in the same space on the film (substantially totally superimposed) and can be separately detected at different sensor positions, P. Identical patterns of the Type B, which compress to a signal at a fixed position with respect to the reading means cannot be superimposed, either, partially or completely. Different patterns of Type B can be partially overlapped or completely superimposed. Identical patterns of any type (A or B) cannot be completely superimposed since they lose their separate identity.

It will be clear also that different patterns can be recorded on the film in two sequences of recordings each one independent of the other. If they are of the same general class, such as different swept frequencies or different FZPP, they can be detected simultaneously as shown in FIGS. 10, 11 and 13. However, I contemplate that two or more different series of recordings can be recorded on the same track, each series requiring different types of reading means. Thus, each series of recordings can be read by passing the film sequentially through two or more reading means of the types of FIGS. 10, 11 and 13. If this is done, it will be clear that the values of D and D′, and $d$ and $d'$ can be different. Of course, if the same reading means is used, then it will be convenient, though not essential, to have $D = D'$ and $d = d'$.

When identical patterns, such as swept frequencies, or FZPP are spaced at dimensions $d$ along the track, they can be sequentially detected at the same sensor. Thus each successive pattern has the same value, such as one bit. However, where different patterns are provided either completely superimposed on the track, or partially overlapped and spaced along the track, and the compressed signal from each pattern is separately and independently readable, then each different pattern can have a different value. Such different patterns can represent different characters, such as decimal digits, for example, and, as a consequence, have increased information value. Thus the different patterns in different systems can represent single bits or single different characters.

In the foregoing descriptions I have given no details of the simple optical assemblies since they are well know in the art.

While I have shown a number of specific embodiments, there will be many more embodiments conceived by those skilled in the art, following the principles outlined above. All of these are considered to be part of this invention, the scope of which is to be determined by the scope of the appended claims.

I claim:

1. The method of storing information in the form of patterns of spaced spots on a record medium comprising the steps of:

a. recording along a track on said record medium a first unique pattern of spaced spots, said pattern of spots of longitudinal dimension D along said track, said spots spaced along said track;

b. advancing said record medium in the direction of said track by an incremental distance $d$, where $d = D/K$, where K has a value greater than 1; and c. recording a second unique pattern of spaced spots along said track, each of said first and said second patterns corresponding to and uniquely indicative of a discrete unit of information and adapted to be compressed and detected by a reading means to single-valued point signals representative of said discrete units of information, all spots in said patterns of the same character.

2. The method as in claim 1 including the additional steps of;

d. after step a) and before step b) recording a third unique pattern of spaced spots of dimension D; and e. after step c) recording a fourth unique pattern of spaced spots of dimension D;

f. said first and third patterns being different from said other being substantially totally superimposed and adapted to be compressed by said reading means to different, independently readable single-valued point signals and g. said second and fourth patterns being different from each other, and being substantially totally superimposed and adapted to be compressed by said reading means to different, independently readable single-valued point signals.

3. The method as in claim 1 in which said first and second patterns are the same and each represents the same unit of information.

4. The method as in claim 1 in which said first and second patterns are different swept frequency patterns.

5. The method as in claim 1 in which said first and second patterns are different portions of Fresnel Zone Plate patterns.

6. The method as in claim 1 in which said first and second patterns are different hologram patterns each one recorded with a different reference beam.

7. The method as in claim 1 in which said first pattern is a linear grating having a first spatial frequency, and said second pattern is a linear grating having a second spatial frequency different from said first spatial frequency.

8. The method as in claim 2 in which said first and third patterns are recorded in the same first unique recording area, and said second and fourth patterns are recorded in the same second unique recording area.

9. The method as in claim 2 in which all four patterns comprise linear gratings each of a different spatial frequency.

10. The method of storing information in the form of patterns of spaced spots on a record medium comprising the steps of;

a. recording along a track on said record medium a first plurality of different unique patterns of spaced spots, each pattern of longitudinal dimension D, with said dimension D directed along said track, said patterns recorded in the same unique recording area of dimension D, each of said patterns indicative of a different discrete unit of information and adapted to be compressed by a reading means to a single-valued point signal, each of said signals from each of said patterns adapted to be read independently of each of the other signals;

b. incrementally advancing said record medium in the direction of said track a distance $d$, where $d = D/K$, where K has a value greater than 1, and c. repeating step a) with a second plurality of different unique spot patterns.

11. The method as in claim 10 in which said first plurality of unique spot patterns are different from each other, and said second plurality of unique spot patterns are different from each other, but at least one pattern of said second plurality is the same pattern as one pattern of said first plurality of patterns.

12. The method as in claim 10 in which said of first and second plurality of patterns comprises a plurality of different swept frequency patterns.

13. The method as in claim 10 in which each of said first and second plurality of patterns comprises a plurality of different Fresnel Zone Plate patterns.

14. The method as in claim 10 in which each of said first and second plurality of patterns comprises a plurality of hologram patterns, each hologram pattern being of a different plurality of spaced point subjects, and including the steps of recording each hologram with a different reference beam.

15. The method as in claim 1 in which successive values of $d$ are the same.

16. The method as in claim 1 in which successive values of $d$ are different.

* * * * *